United States Patent [19]
Hilger et al.

[11] Patent Number: 5,313,876
[45] Date of Patent: May 24, 1994

[54] SPAGHETTI COOKING SYSTEM

[75] Inventors: Robert L. Hilger; John R. Davis, both of Shreveport; John A. Meister, Haughton, all of La.

[73] Assignee: The Frymaster Corporation, Shreveport, La.

[21] Appl. No.: 702,773

[22] Filed: May 17, 1991

[51] Int. Cl.$^5$ .............................................. A47J 27/00
[52] U.S. Cl. .......................................... 99/330; 99/331; 99/336; 99/403; 126/374; 126/383; 137/341; 137/392; 219/437; 392/444
[58] Field of Search ................................. 99/330–333, 99/327, 336, 337, 403, 407, 408; 137/341, 392; 219/437; 366/153; 392/444–447; 126/374, 383, 380

[56] References Cited

U.S. PATENT DOCUMENTS

| | | | |
|---|---|---|---|
| 2,287,396 | 6/1942 | Roth | 99/408 |
| 2,533,930 | 12/1950 | Harr | 392/445 |
| 2,978,975 | 4/1961 | Rossi | 99/330 |
| 3,107,601 | 10/1963 | Longmire | 99/330 |
| 3,788,302 | 1/1974 | Malaney et al. | 99/330 |
| 3,839,951 | 10/1974 | Palmason | 99/330 |
| 4,450,757 | 5/1984 | Alfio | 99/330 |
| 4,491,146 | 1/1985 | Sveds | 137/341 |
| 4,508,026 | 4/1985 | Anetsberger et al. | 99/336 |
| 4,574,688 | 3/1986 | Barbieri | 99/330 |
| 5,103,801 | 4/1992 | Herring et al. | 126/374 |

Primary Examiner—Harvey C. Hornsby
Assistant Examiner—Mark Spisich
Attorney, Agent, or Firm—Hubbard, Tucker & Harris

[57] ABSTRACT

A pasta cooking system including an automatic control which permits a cooking vat containing water to be automatically filled to a predetermined level in response to turning the system on, maintained at a constant level by the addition of water during repeated cooking cycles, remove the starchy froths resulting from a cooking cycle in response to a manual input by adding additional water to cause water to rise above the automatically maintained level and overflow a skimming weir, drained by manually opening a valve and automatically rinsed by leaving the control system on during the drain time as water is continually added by the automatic fill system to clean the pot. The water is introduced by the automatic system in such a manner to cause surface agitation during the skim procedure, and to rinse the walls of the vat during the drain cycle. A water level sensing uses a single stainless steel probe and a low voltage a.c. current between the probe and a stainless steel vat to prevent cathartic corrosion.

8 Claims, 7 Drawing Sheets

SPAGHETTI COOKING SYSTEM

BACKGROUND OF THE INVENTION

This invention relates generally to cooking systems, and more specifically relates to method and apparatus for cooking, storing and reconstituting pasta.

Spaghetti and other pasta products are popular with customers and proprietors of convenience restaurants. Costs are considerably less per serving to buy and prepare spaghetti than for most other fast foods. However, the difficulties in time delays in rapidly preparing spaghetti had made its use as a fast food impractical for most quick service eating establishments.

U.S. Pat. No. 3,958,503, issued to L. Frank Moore, on May 25, 1976, discloses a system which made cooking and serving pasta more economical. In this system, the pasta is cooked in a cooking vat prior to rush periods, and then is rinsed to remove the starch and transferred to a number of containers each holding only one serving. Pasta in the container is then stored in a second vat under water until it is to be served. On demand, the pasta is then placed back in hot water for a short period of time to reconstitute the pasta, resulting in a single serving having fresh cooked quality.

This system includes a cooking vat and a storage vat. A basket lift is provided to mechanically lower and raise either bulk cooking containers, or the individual serving containers during reconstitution. The basket lift is controlled by a pair of manual timers, one for controlling the cooking period and the other for controlling the reconstituting period, so that the pasta is automatically cooked or reconstituted for the desired length of time. A single swiveled water faucet could be used to fill both the cooking vat and the reconstituting vat, and rinse the pasta, and clean the vats. A manually operable drain valve is provided for each of these vats so that water can be dumped when required.

While the above system was a significant improvement in the art of cooking pasta, and has achieved significant commercial success, there are certain deficiencies which could be overcome. The system was somewhat labor intensive because all filling and cleaning of the vats was done manually and required close personal attention throughout the procedure. When cooking or reconstituting pasta, a great deal of starch is left in the cooking water which accumulates as a foam on top of the water. The foam becomes particularly critical when the water is boiling during cooking because the agitated surfaces due to boiling enhances the foam formation. As a result, it was previously necessary to drain, clean and refill the cooking vat relatively frequently. Not only is this draining, cleaning and filling labor intensive and time consuming, but productive cooking time and energy are also consumed each time the substantial volume of water must be heated to boiling.

The present invention is concerned with improvements in the system disclosed in the above referenced patent which significantly reduce the labor required to drain, clean and fill the cooking vats, reduces the frequency with which the cooking vat must be drained, reduces down time from cooking, and reduces energy consumption. The improvement in the system includes an automatic water fill for the cooking vat, includes a water fill valve, a level sensor and a control circuit which also automatically maintains the water at a predetermined normal operating level during cooking. In accordance with another important aspect of the present invention, an overflow weir leading to a waste disposal drain is provided at a level just above the normal operating level which results in the automatic removal of any excess water which might enter the cooking vat during the rinsing operation. The overflow weir is designed to provide a substantial width of cascading water so that by keeping the water fill valve open even though the water is above the normal operating level for a predetermined time so that excess water is introduced which overflows the weir to remove starchy foam from the surface of the water.

In accordance with another important aspect of the invention, a drain is provided for the cooking vat which will remove water by gravity at a greater rate than water can be added through a fill valve and nozzle. As a result, during a cycle, water is automatically introduced to the vat during the entire drain cycle to provide automatic rinsing.

In accordance with another important aspect of the invention, the water is introduced to the cooking vat by means of a spray nozzle which enhances movement of foam on the surface of the water over the weir during a skim cycle, and also which enhances rinsing of the vat during a drain cycle.

In accordance with another aspect of the invention, a low water level detector is provided and a microprocessor based control system is provided to prevent operation of the heating elements whenever the water is below the low level detector.

In accordance with another aspect of the invention, a low cost water level sensing system is provided which uses single rod electrical probes and the wall of the cooking vat to detect the presence or absence of water by the reduced electrical resistances of the water between the two. Cathodic corrosion is avoided by using a low voltage, low amperage alternating current through the water.

The control system also includes programmable timers for the cooking and the reconstituting cycles which control basket lifts for lowering and raising the pasta from the hot water. The system also includes a thermostatically controlled heater for establishing a simmer temperature below the boil temperature to prevent surface agitation and water loss during period other than the cook cycle. A keyboard entry system permits changing the times for each of the cook and reconstitution cycles as well as on/off, boil, simmer, skim, and start time.

These and other objects and advantages of the present invention will be apparent to those skilled in the art from the following detailed description of the preferred embodiment by the drawings in which.

Figure 1:
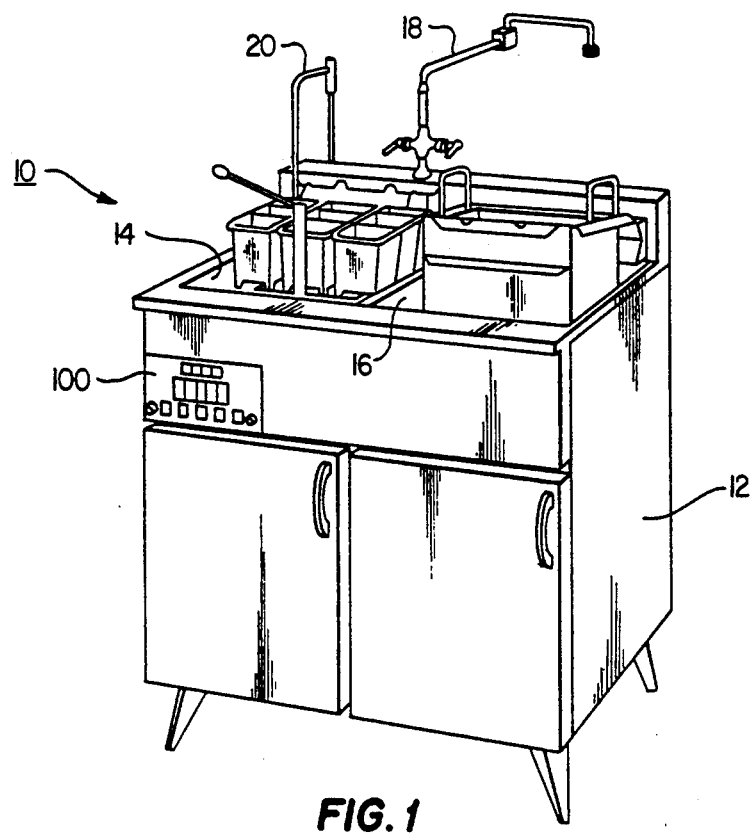
FIG. 1 is a perspective view of a pasta cooking system in accordance with the present invention.

Referring now to the drawings and in particular to FIG. 1, a pasta cooking system in accordance with the present invention is indicated generally by the reference numeral 10. The system 10 is similar to that illustrated and described in the above referenced U.S. Pat. No. 3,958,503. Accordingly, the system 10 includes a cabinet 12 which supports a cooking vat 14 and a holding vat 16. The holding vat 16 is essentially a deep sink having a drain with a manually operable valve, neither of which is illustrated. A swivel faucet 18 is provided to be used to wash pasta or add water to the holding vat 16, or to use water as otherwise desired. A basket lift 20 is provided to raise and lower a large container for bulk pasta during the cooking cycle, or to raise and lower one or more individual serving baskets. All of the above components may be essentially as described and illustrated in the above referenced patent.

Figure 2:
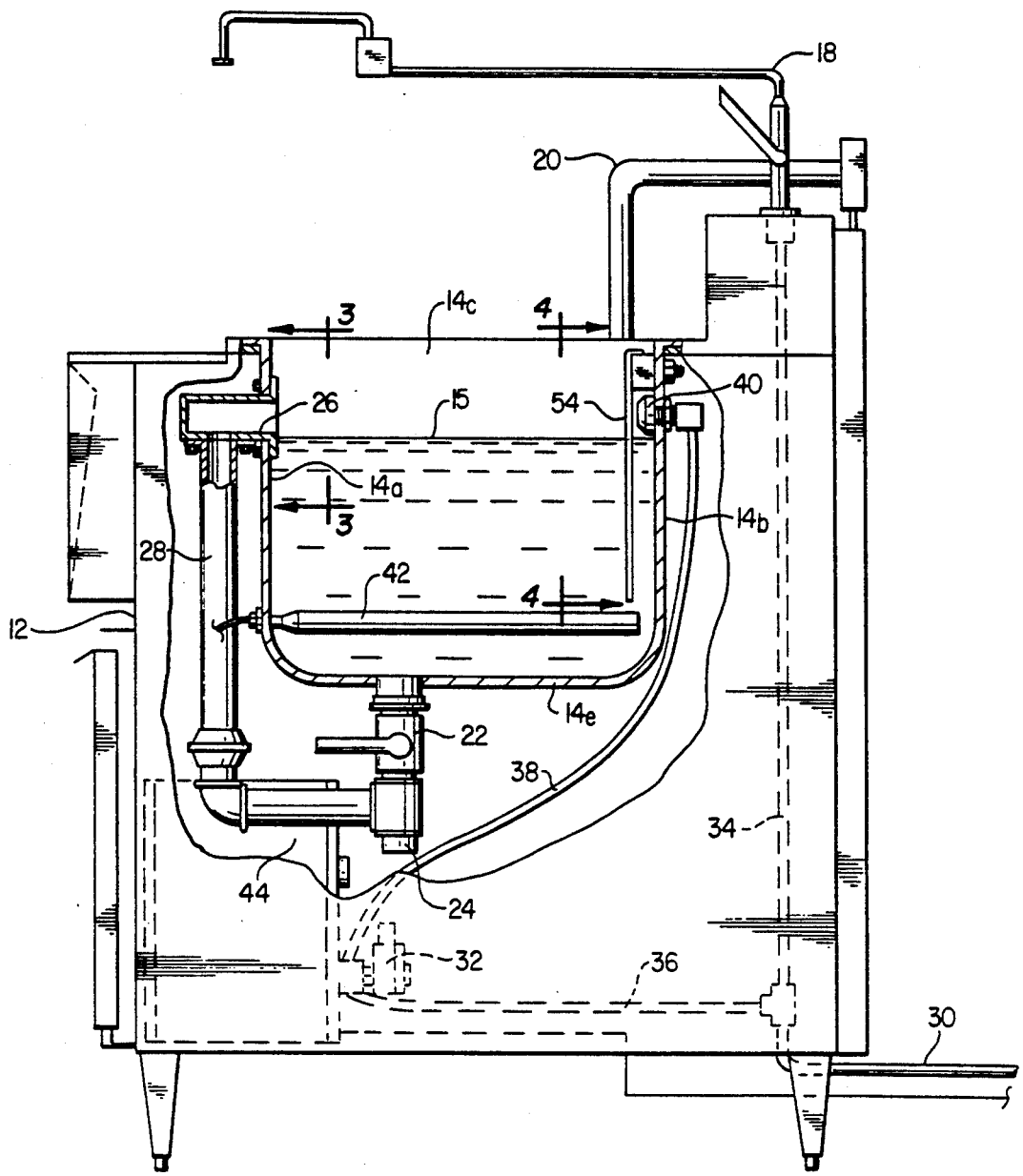
FIG. 2 is a somewhat schematic side elevation, partially in section, of the pasta cooking system in accordance with the present invention.
Figure 3:
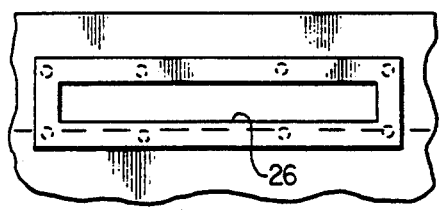
FIG. 3 is a partial sectional view taken substantially on lines 3—3 of FIG. 2.

The cooking vat 14 is illustrated in greater detail in FIG. 2 and is comprised of a deep drawn, single piece, stainless steel unit having opposite front and rear walls 14a and 14b, opposite side walls 14c and 14d, and a bottom wall 14e, and is suitably supported in the cabinet 12. A manually operated drain valve 22 is provided to drain water from the cooking vat into the local sewer system or other waste disposal means through conduit 24. An overflow weir 26 is positioned in the front wall 14a of the vat 14 and is connected through appropriate plumbing 28 to the drain 24. The overflow weir 26 is thus in constant fluid communication with the waste disposal drain 24.

A water inlet line 30 is connected to a source of pressure, such as the local water supply, and is connected to both the faucet 18 and to a solenoid controlled water fill valve 32 through lines 34 and 36, respectively. The output of the fill valve 32 is connected through a hose 38 to a spray nozzle 40 mounted in the rear wall 14b of the cooking vat 14. Either hot or cold water may be provided to the fill valve 32. A submersible electric heating element 42 is positioned near the bottom of the vat 14 and is connected to the power supply which is operated by a control circuit which will presently be described in detail mounted generally in an enclosure 44 in the lower part of the cabinet 12.

Figure 4:
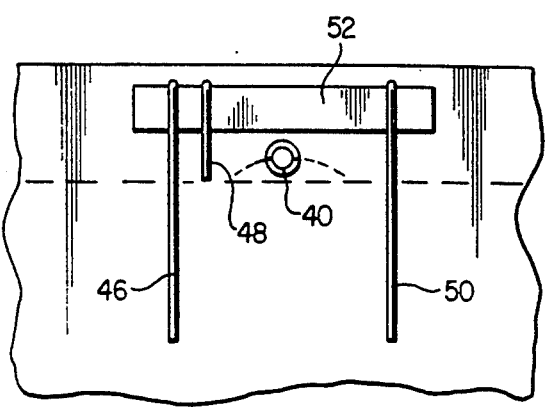
FIG. 4 is a partial sectional view taken substantially on lines 4—4 of FIG. 2.
Figure 7:
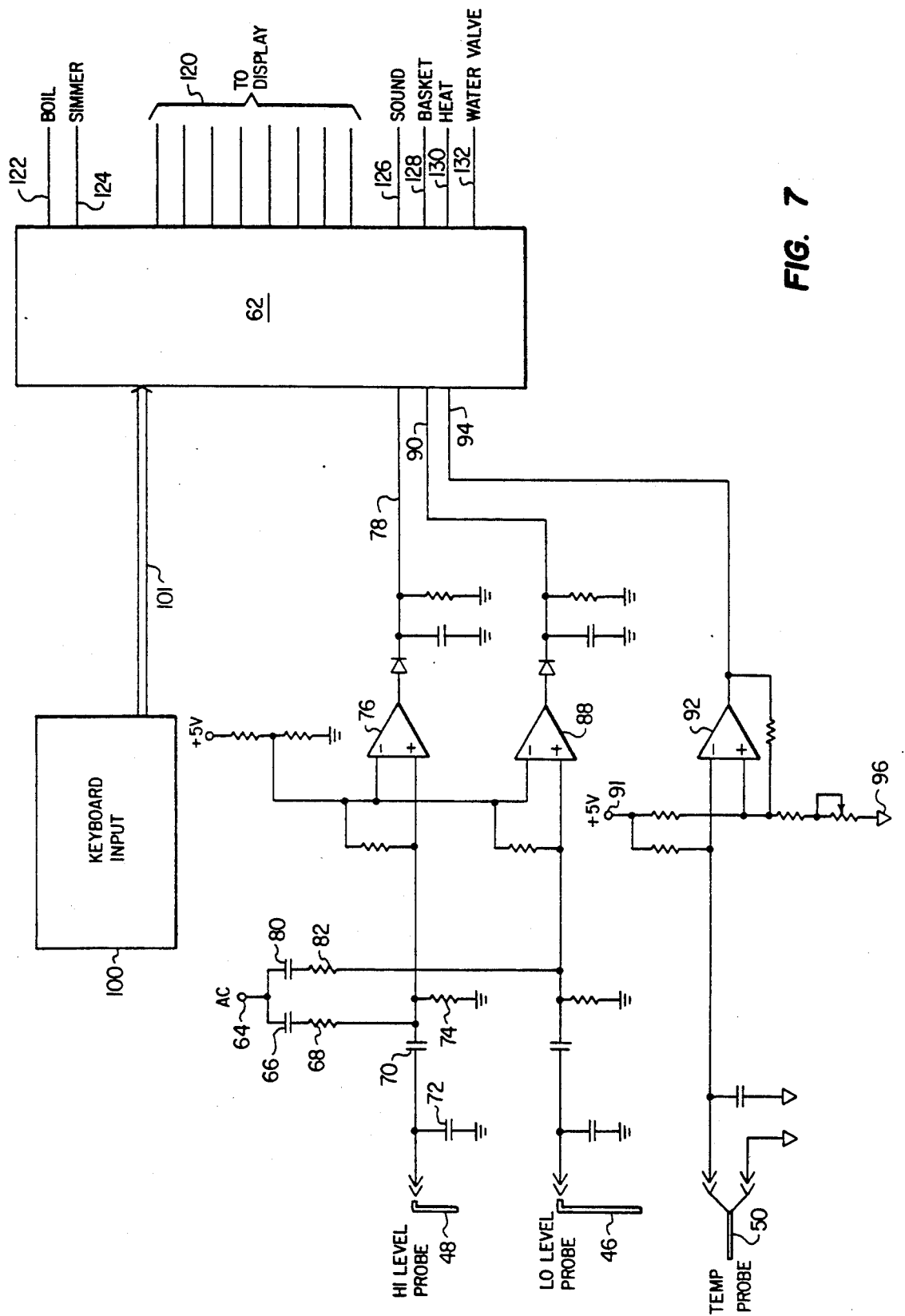
FIG. 7 is a schematic circuit diagram illustrating the microprocessor based control for the system of FIG. 1.

As can best be seen in FIG. 4, low and high water level detector probes 46 and 48 and a temperature probe 50 are mounted on a support block 52 attached to the rear wall 14b of the vat 14. A shield 54 is suspended from the block 52 to protect the three probes. In accordance with an important aspect of the invention, the water level detecting probes 46 and 48 are unitary conductive rods which, in combination with the metal wall of the cooking vat 14, use alternating current to detect the change in resistance when water touches the lower ends of the probes. The lower end of the low water level probe 46 is positioned significantly above the electric heating element 42 and is used to ensure that the electric element 42 cannot be energized without an adequate supply of water in the cooking vat. The lower end of the high water level detecting probe 48 is positioned just below the level of the weir 26, and is used by the control circuit to establish a normal operating water level 15 in the cooking vat for both the cooking and reconstituting cycles.

The water nozzle 40 is disposed just above the level of the weir 26 and has a number of small openings which establish a water flow around the perimeter of the surface of the water during a skim cycle, as will presently be described in greater detail in connection with FIG. 5, and over the side walls and bottom of the cooking vat to rinse the vat during a drain cycle. The amount of water introduced through the valve 32 and nozzle 40 is less than the rate at which water is drained through the valve 22 when opened so that rinsing can occur automatically during a drain cycle as hereafter described.

Figure 6:
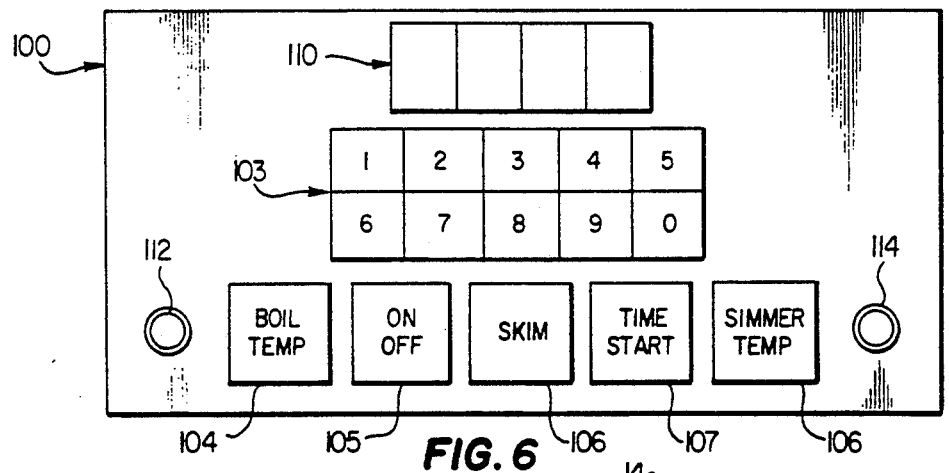
FIG. 6 is an illustration of the control panel of the system of FIG. 1.

A microprocessor based controller for the system 10 is indicated schematically and designated generally by the reference numeral 60 in FIG. 6. The controller 60 includes a commercially available microprocessor 62 which may conveniently include both programmable and dynamic memories necessary for storing an operating program, and for using the program to operate the system 10 in response to operator inputs through the keyboard. The power supplies for the various components of this system are eliminated for convenience of illustration, but are conventional and well known in the art.

As previously mentioned, the low level probe 46 and high level probe 48 are single conductor rods which are merely suspended in the water. The rods may be of any suitable conductive material so that an alternating electrical potential, transformed from the local utility power supply, can be applied between the rods 46 and 48, respectively, and the conductive metal of the vat 14 so that the resistance of the air or water between the respective probes and the vat wall can be measured. A significant reduction in the measured resistance indicates that water touches at least the lower end of the respective rods.

Thus, an alternating current from a power supply 64 is coupled through capacitor 66, resistor 68 and capacitor 70 to the high level probe 48 and through capacitor 72 and resistor 74 to ground, and thus to the wall of the vat 14, which is, of course, grounded. The resistor 74 and the resistance of the water between the probe 48 and the vat forms a biasing network for the positive input of the operational amplifier 76. The amplifier 76 is biased in the conventional manner by the resistive network illustrated to operate in a switching mode in response to the presence or absence of water touching the probe 48 so as to provide essentially a digital signal on line 78 to the microprocessor 62.

Similarly, the alternating current power supply is connected to the low water level probe 46 through capacitor 80, resistor 82 and capacitor 84 so that the resistance between the probe 46 and the wall of the vat is in parallel with resistor 86 and capacitor 87 to form the voltage divider coupled to the input of operational amplifier 88. The operational amplifier 88 is also biased to operate in the switching mode so as to produce essentially a high/low digital level on input 90 to the microprocessor 62.

The temperature probe 50 is a conventional two-wire, temperature sensing probe which is operated by direct current source 91 and is coupled to operational amplifier 92, all in a conventional manner to produce an input 94 to the microprocessor 62. The input switches to indicate when the water temperature transitions through a temperature below boiling, typically about 205°. A variable resistor 96 is provided in the biasing network to adjust this temperature. As will presently be described, the microprocessor 62 operates the heater 42 in a thermostatic type on/off mode to maintain a desired simmer temperature of about 205°.

The outputs from the control panel illustrated in FIG. 6 are connected to the microprocessor 62 as represented collectively by data bus 101. These outputs are derived from manual actuation of switches which include the ten numeric buttons 1 through 0 for programming the timer, indicated collectively by the reference numeral 103, and mode switches 104–108 which represent boil temperature, on/off, skim, start time and simmer temperature, respectively. A four digit alphanumeric display 110 is controlled by outputs represented by data bus 120. Indicator lamps 112 and 114 light up when operating in the boil and simmer modes respectively in response to outputs from the microprocessor on 122 and 124, respectively.

In addition, the microprocessor is coupled to an alarm sound through line 126, to operate the basket lowering and raising mechanism as represented by line 128, to turn the power the heating coils on and off as represented by line 130 and to turn the water valve on and off as represented by line 132. The microprocessor is permanently programmed to operate the system using the program represented by the flow charts of FIGS. 8–16.

Figure 8:
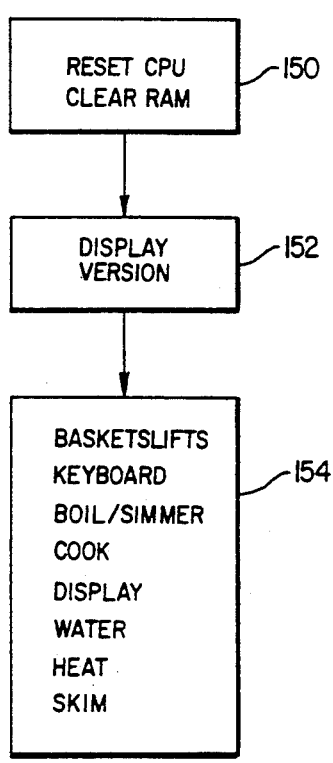
FIGS. 8-16 are schematic flow charts which serve to illustrate the manner in which the microprocessor is programmed to operate the system of FIG. 1.
Figure 9:
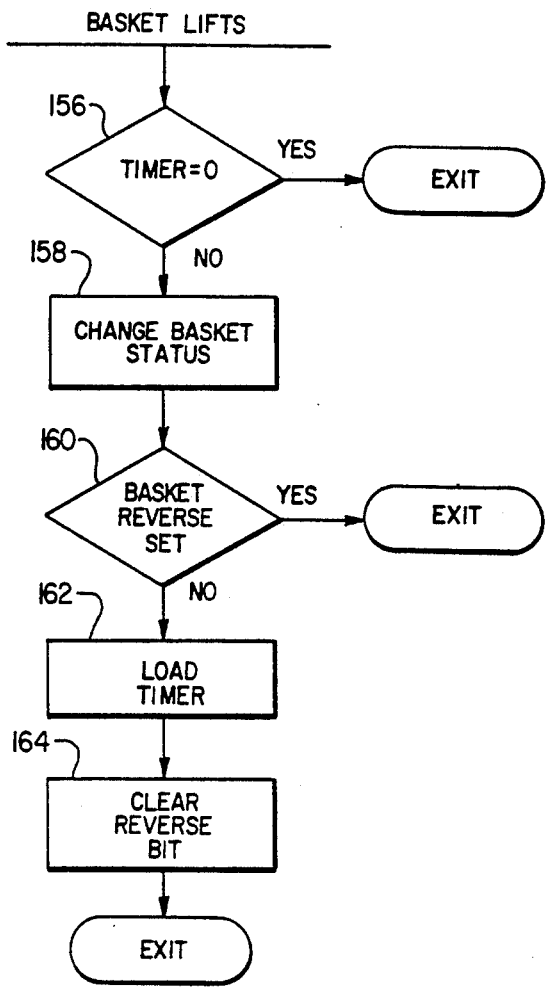

As illustrated in FIG. 8, when the power is first turned on, the program resets the central processing unit and clears the random access memory as represented by block 150. Next, the particular software version which is being employed in the system is displayed as represented by block 152. The program then enters the main loop as represented by block 154 and proceeds to repeatedly cycle through the subroutines illustrated in FIGS. 9–16, the headings of which are displayed in the block 154.

Thus, during the "basket lift" subroutine, a timer which provides enough time for the basket lift to completely lower and return is first checked to see if the count is equal zero as indicated by block 156. If equal zero, the subroutine is exited. If not, a bit representing the basket status is changed as represented by block 158 and then the basket reverse bit checked as represented by block 160. If the basket reverse bit is set, the subroutine is exited. If the basket reverse bit is not set, the timer of block 156 is loaded with the predetermined count as represented by block 162, and the reverse bit is cleared as represented by block 164 before the subroutine is exited.

Figure 10:
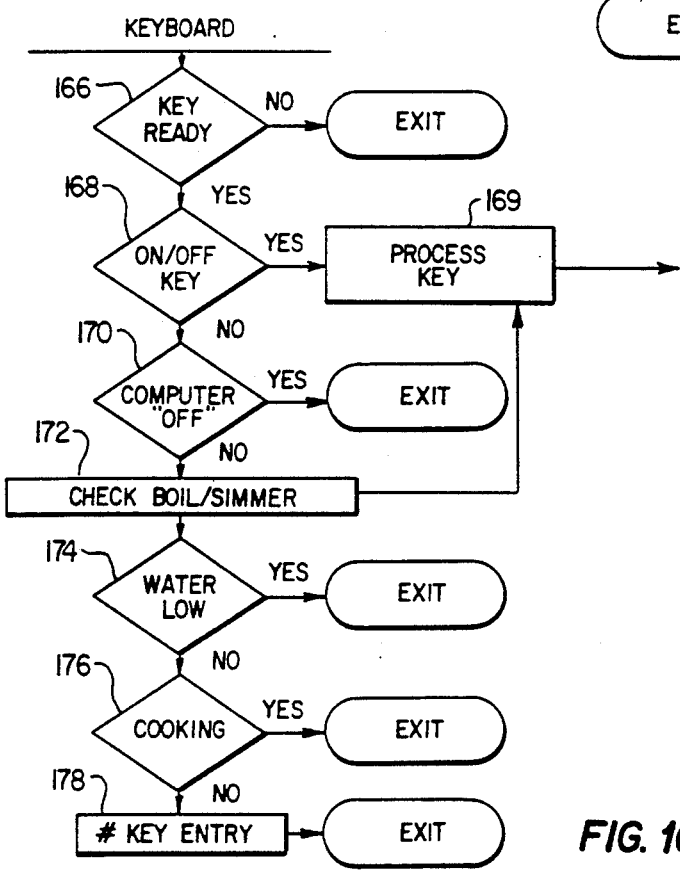

After exiting the basket lifts subroutine, the keyboard subroutine of FIG. 10 is entered where first a check is made to determine if any key is actuated to provide input information, as represented by block 166. If not, the subroutine is exited. If a key is ready, it is first checked to see if it is an on/off key as represented by block 168. If yes, the program proceeds to carry out the function in block 169 of turning the system on. If the on/off key is not the active key, it is checked to determine if the computer is off as represented by block 170. The computer maintains a status which is toggled by the on/off button on the panel. If the computer is off, the subroutine is exited; if on, the boil or simmer keys are checked as represented by block 172. If a boil or simmer key is active, the function is started as represented by block 169. If not, the computer next checks to see if the water is low as represented by block 174, and if so, exits the subroutine. If not, a check is made to see if the system is in a cooking mode, and if so, exits the subroutine. If not, a check is made to see if a number key is active, and if so, the number is entered as represented by block 178 before exiting the subroutine. The numbers are entered in a display register sequentially and displayed.

Figure 11:
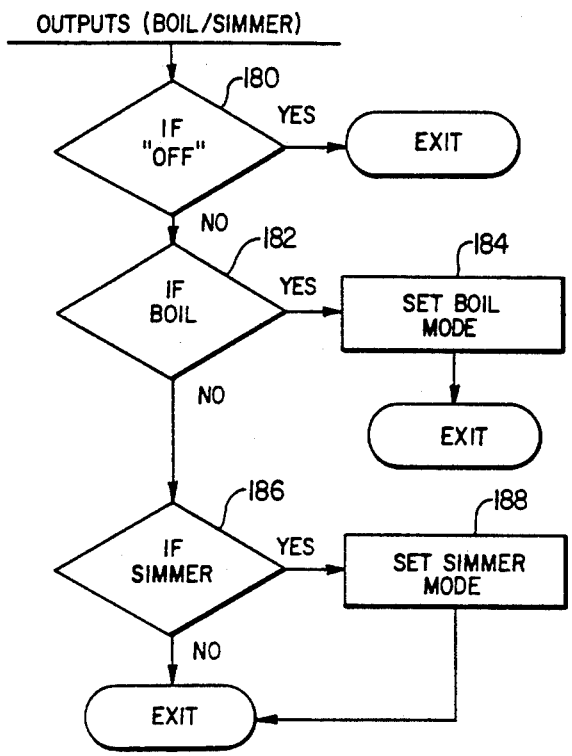
Figure 12:
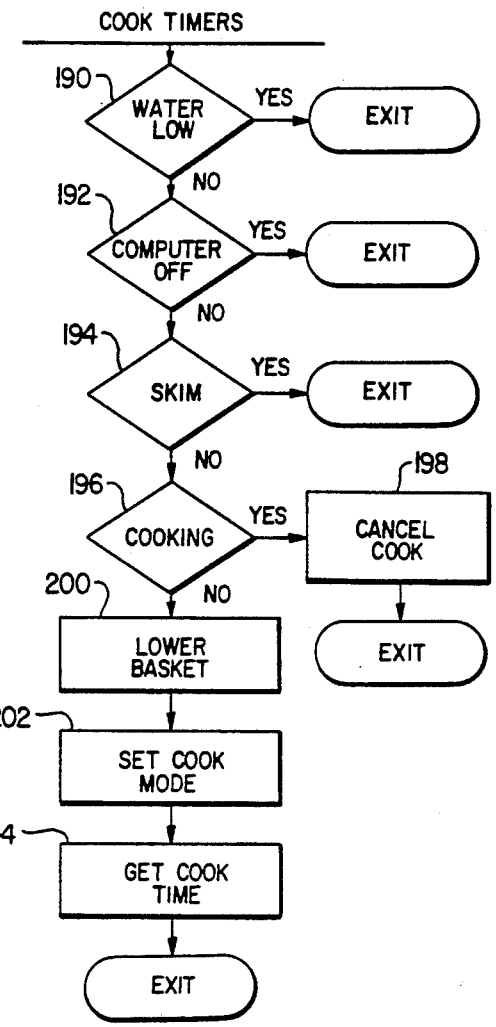

Next the computer enters the output subroutine for boil-simmer illustrated in FIG. 11. First, a check is made to see if the status resulting from the on/off switch is off, and if so, the subroutine is exited as represented by block 180. If the computer system is not in the off status, a check is made to see if the boil mode has been activated as represented by block 182, and if so, the set boil mode status is achieved at block 184 before exiting the subroutine. Similarly, if the simmer switch is active, the simmer mode status is set as represented block 188 before exiting the subroutine.

A subroutine which responds to an input from the start time button 107 is illustrated in FIG..12 where the water level is first checked as represented as block 190. If the water is low, the subroutine is exited. If not, the computer off switch is checked at 192. If the on/off status is off, the subroutine is exited, and if on, the skim status mode is checked at block 194. If the skim mode is on, the subroutine is exited, and if off, the cooking mode is checked at block 196. If the system is cooking, the cook mode is canceled as represented in block 198 and the subroutine exited. If not already cooking, the basket lift is lowered as represented by block 200 and the cook mode is set on as represented by block 202, and the cook time is fetched as represented by block 204 before exiting the subroutine.

Figure 13:
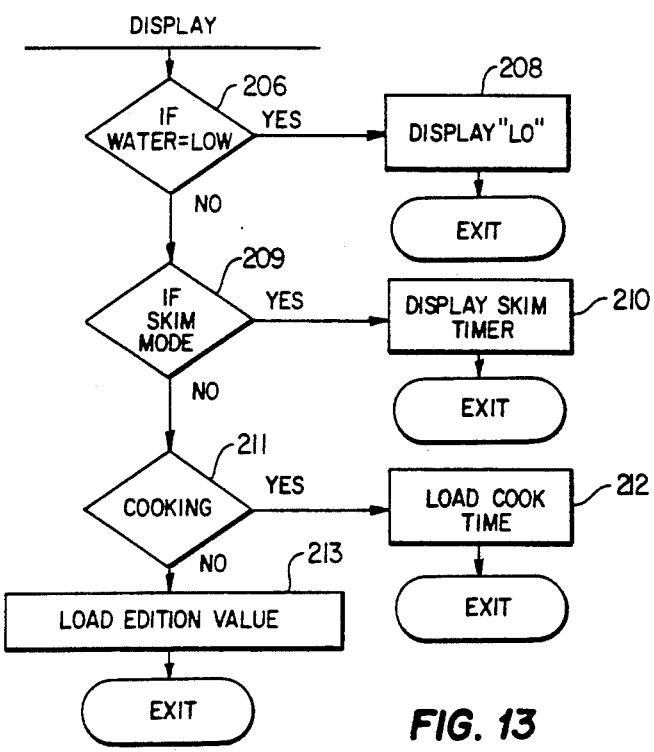

Next the display subroutine represented in FIG. 13 is entered by first checking to see if the water is low as represented by block 206. If the water is low, the letters "LO" is displayed as represented at 208 and the subroutine exited. If not, the skim mode is checked as represented by block 209 and if in the skim mode, the remaining time on the skim timer is displayed as represented by block 210 before exiting the subroutine. As a part of the skim mode initiation, a timer is initiated when the skim mode is started so that the water valve will remain open for a predetermined time, for example, two minutes. If not in the skim mode, the cooking mode is checked as represented by block 211. If in the cooking mode, the time remaining in the cook timer is displayed as represented by 212. If not in the cook mode, the cook time is loaded from the display register as represented at block 213 before finally exiting the display program.

Figure 14:
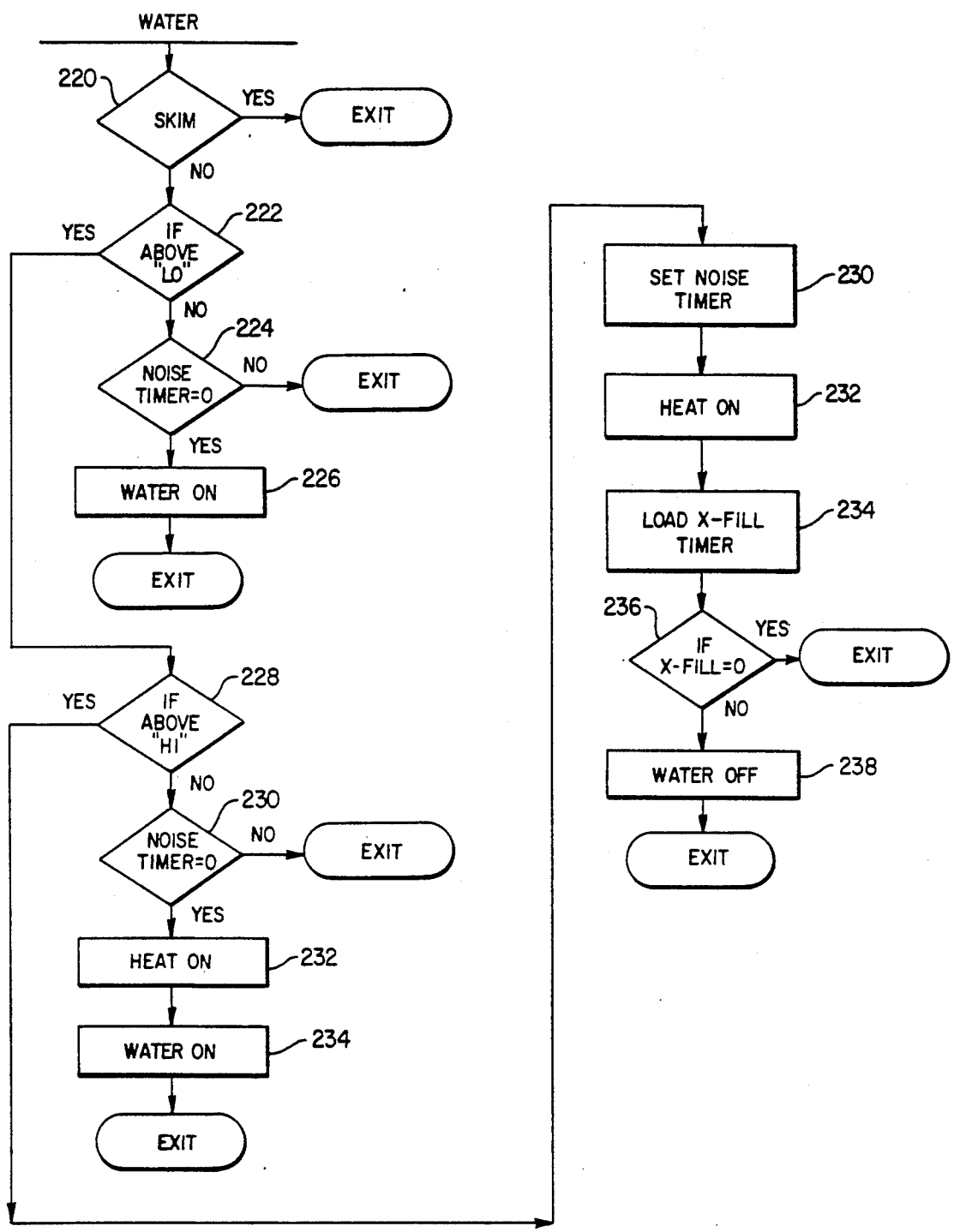

Upon entering the water subroutine illustrated in FIG. 14, the skim mode is checked as represented by block 220 and, if in the skim mode, the subroutine is exited. If not, a check is made to determine if water level is above the low water level. If so, it is checked to see if the noise timer is equal to zero and if not, the subroutine is exited. The noise timer records the number of times the computer has passed through the main program loop. This timer, which counts down, is typically set at 255 and is used to prevent chatter of the water valve. If the noise timer is equal to zero, the water is turned on as represented by block 226 and the subroutine exited. If the water is above the low level as indicated at block 222, it is next checked to determine if the water is above the high level at block 228. If not, the noise timer is again checked at block 230 to see if it is equal to zero, and if not, the subroutine is exited. If the noise timer is zero, the heat is turned on as represented by block 232 and the water is turned on as represented by block 234 before the subroutine is exited. If the water is below the high, which is the normal operating level, the noise timer is set to the original number as represented by block 230, the heat is turned on as represented block 232 and the x-fill timer is loaded as represented by block 234. The purpose of the x-fill timer is keep the water valve on for fifteen seconds after the high water level probe first detects water to ensure that the final water level is above the end of the probe. This prevents unduly rapid cycling of the water valve as the result of evaporation or other water loss. If the count in the x-fill timer is not zero, as represented by block 236, the subroutine is exited. If the fill timer is zero, the water is turned off at block 238 and the subroutine exited.

Figure 15:
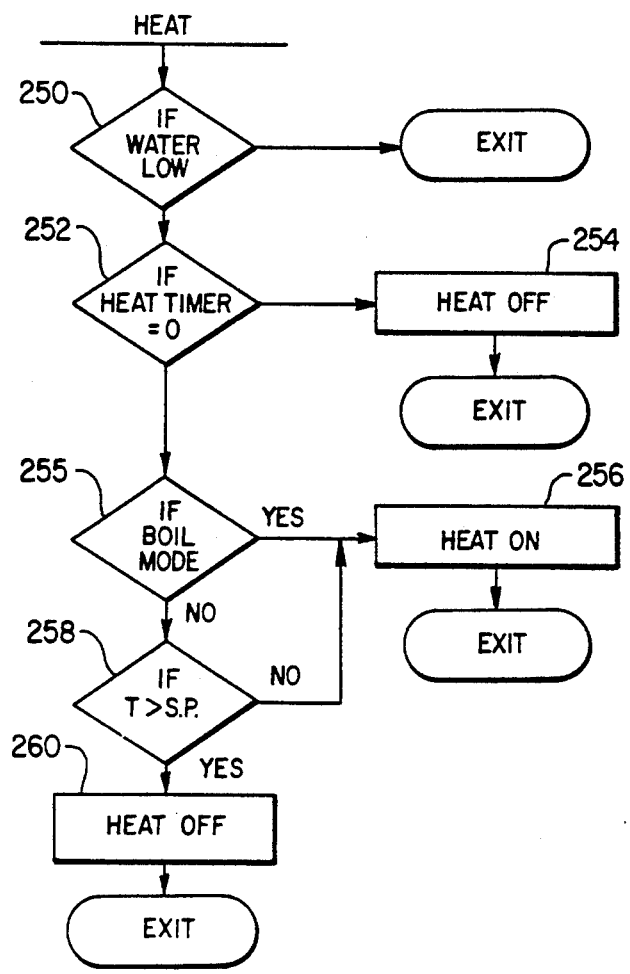

Next the heat subroutine illustrated in FIG. 15 is entered by first checking to see if the water level is below the low level as indicated by block 250 and if so, the subroutine is exited. If the water is above the low level, the heat antichatter timer is checked at block 252. If the count of the timer is not zero, the heat is turned off at block 254, and the subroutine exited. If the heat timer is zero, the boil mode status is checked at block 254 and if in the boil mode is set, the heat is turned on as represented by block 256 and the subroutine exited. If not in the boil mode, a check is made of the signal from the temperature probe to see if the temperature is greater than the simmer point as represented by block 258, and if the temperature is less than the simmer point, the heat is turned on as represented by block 256 before exiting the subroutine. If the temperature is greater than the simmer point, the heat is turned off as represented at block 260 and the subroutine is exited.

Figure 16:
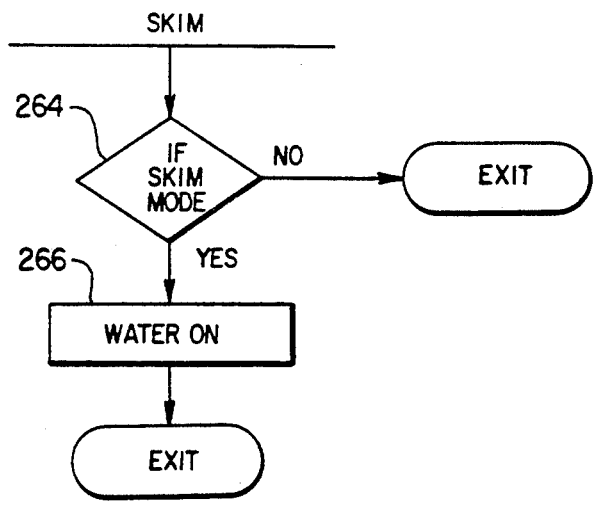

Finally, skim subroutine illustrated in FIG. 16 is entered by first checking to see if the skim mode is set at block 264 and if not, the subroutine is immediately exited. If the skim mode is set, the water valve is turned on at 266 and the subroutine exited.

Figure 5:
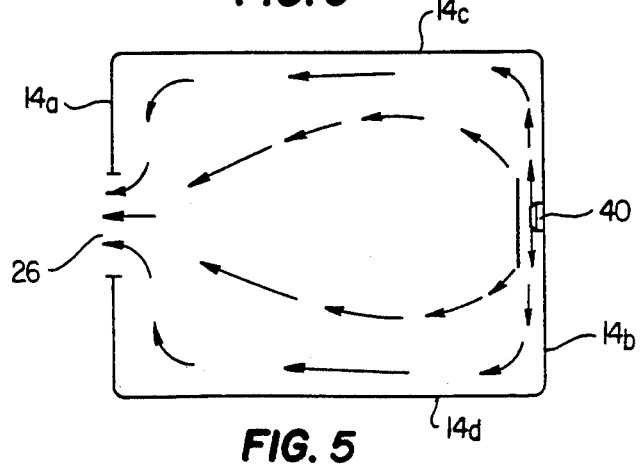
FIG. 5 is a schematic plan view of the cooking vat of the system of FIG. 1 which illustrates water flow during a skim cycle.

In the normal operation of the system 10, power for the system 10 is turned on by a manual switch, not illustrated, to power up the control system including that represented in FIG. 5. The water valve will be off, the basket lifts up, the power to the heater turned off and the drain valve closed. The random access memory will have been cleared in block 150 and the software version will be displayed by the display to indicate that power is on, and the computer will then be operating in the main loop 54.

Assume that no water is in the cooking vat 14. When the on/off switch is pressed, a water low condition will be detected and displayed to the operator as "LO" as a result of the operation of the blocks 206 and 208. In addition, the water valve will be almost immediately turned on as a result of blocks 222 and 226 of the water subroutine. The water valve will continue to remain open until water is detected by the high level probe and for approximately fifteen seconds after that as determined by the x-fill timer in block 236.

At any time, the operator can select either the boil temperature button 104 or the simmer temperature button 108 and the corresponding display light 112 or 114 will be illuminated, indicating the selected mode. Then as soon as the water level reaches the low level probe, the heat will be turned on to start heating the water to the selected temperature.

At any time the operator may put four digits in the display 110 by pressing the appropriate numerical buttons 103, the numbers being scrolled from right-to-left in the display as entered. Assuming that pasta is to be cooked, the boil temperature button will normally be pushed to turn the heating element on continuously until the simmer temperature button is subsequently pushed. When the boil temperature button 104 is pushed, the indicator light 112 is illuminated. When it is desired by the operator to start the cooking cycle, the start time button 107 is pushed, which results in the basket lowering the pasta into the water. As the cooking period progresses, the time remaining is continually displayed to the operator. When the cooking period has expired, the basket lift automatically raises the pasta from the water, and the full time previously entered in the display is again displayed. The operator can then rinse the pasta with cold water from the faucet 18 and place the pasta in the individual serving baskets for storage in the adjacent vat. Since the cooking time period has been automatically returned to the display register, the operator need only press the time start button 107 to start another cooking cycle.

When the cooking operation has been completed, the control automatically reverts to the simmer mode. The computer together with the temperature probe 50 functions in a thermostatic mode to turn the electrical heating element on and off and maintain the temperature of the water at the desired simmer temperature below boiling, typically about 205°. Using the simmer temperature when operating in the standby mode minimizes the creation of starchy froth due to surface agitation caused by boiling.

When it is desired to reconstitute pasta which has previously been cooked, the desired time is set into the display, for example 15 seconds, and the start time button pressed. The basket lift automatically lowers the pasta into the water which may be at the simmer temperature, or boiling as desired, for the period of time entered into the timer. The time set in the timer reappears at the end of each timed cycle so that subsequent reconstituting cycles requires only the pressing of the start time button 107.

Whenever an operator desires to remove the foam from the top of the cooking vat, the operator need only press the skim button 106. This results in the water fill valve 32 being immediately opened so that water is forced through the nozzle 40 onto the surface of the water. It will noted that the nozzle 40 is slightly above the normal operating level of the water 14a which is defined by the lower end of the probe 48. Since the nozzle 40 has three small apertures arranged generally as illustrated in FIG. 4, substantially currents are established in the surface of the water as illustrated by the arrows in the schematic diagram of FIG. 5. As the water level raises and overflows the weir 26 into the drains 28 and 24, the surface flow currents carry the starchy foam over the weir into the drain. It has been found to be very important that the weir 26 to have a substantial horizontal width so that a generally uniform layer of water will cascade over the full width of the weir. Otherwise, the foam, which can be quite stiff, tends to bridge between the two sides of the opening, preventing effective removal from the vat. Similarly, it is important for the height for the opening in the vat above the weir to be sufficient to permit the foam to flow freely into the drain without contacting the upper side of the opening and thereby to prevent effective skimming.

The water is introduced during the skimming cycle for a predetermined time period, typically about two minutes, without attention from the operator. After that time period, the water valve 32 is automatically closed. Thus, the entire skimming cycle can be accomplished at any time by the operator merely pushing the skim button. It is customary to perform the skimming function while the unit is in the simmer temperature mode. The skim cycle thus removes the starchy foam and prolongs the time during which a given vat of water can be used for cooking and/or reconstitution without being discarded through the drain 22. This not only conserves electrical energy required to reheat cold water used to refill the vat, but also minimizes down time of the unit during critical periods of operation.

When it is desired to drain the vat, the operator need only open the drain valve 22. This can be done at any time without danger of harming the system due to the low level detector. When the valve 22 is open, as soon as the water drops below the high level probe, the valve 32 is immediately turned on to spray water from the nozzle 40 as water continues to drain from the vat. This is due to the fact that the water drains through the drain valve 22 at a much greater rate than water can be introduced through the nozzle 40. As a result, the spray from the nozzle 40 immediately sets up currents along the side walls of the vat 14 as the water level lowers to rinse the side walls, and finally the bottom wall with considerable efficiency due to the fact that the sprayed water spreads around the side walls to reasonably cover the bottom wall. It will be noted that as the water level falls below the low level probe, the heating element 42 is automatically disable so that it is protected as the water falls below the heating element.

When the opportunity presents itself, the drain cycle can be terminated by merely closing the manually operated drain valve 22, at which time water again fills the vat 40 as previously described because the fill valve remains open.

Thus from the above detailed description of preferred embodiments of the invention, it will be appreciated that an improved system for cooking pasta has been described which substantially reduces the manual labor required in filling, operating, and cleaning the unit, which makes the unit available for use for longer periods of time, and which reduces the consumption of energy, yet which is economical to manufacture.

Although preferred embodiments of the invention have been described in detail, it is to be understood that changes, substitutions, and alterations can be made therein without departing from the spirit and scope of the invention as defined by the appended claims.

What is claimed is:

1. A system for preparing pasta comprising:
a cooking vat for holding a supply of water having a drain including a valve for draining water from the vat and an overflow weir defining a maximum water level in the vat at which point water flows over the weir by gravity into a waste drain,
electrical heating means disposed near the bottom of the vat for heating water in the vat,
means for adding water to the vat from a supply of water under pressure including an electrically operated fill valve,
high level detecting means for detecting a normal high water level which is below the level of the overflow drain,
low level detecting means for detecting a low water level which is above the electrical heating means,
temperature sensing means for detecting when the temperature of the water in the vat is at a simmer temperature below boiling temperature, and
control means responsive to the high level detecting means, the low level detecting means, and the temperature detecting means, said control means including manual input means for selecting an "on" mode, a boil mode, a simmer mode, a skim mode, and a selectable duration cook mode, and for
automatically opening the fill valve whenever the system is in the "on" mode and the high level detecting means is not detecting the normal high water level,
opening the fill valve when in the skim mode to add water to the vat and overflow the weir,
turning the heating means on continuously during the boil mode unless the low level detecting means is detecting the low water level,
activating the heating means for maintaining the temperature of the water at the simmer temperature during the simmer mode unless the low level detecting means detects the low water level or the temperature sensing means detects the simmer temperature, and
timing the duration of the cook mode in response to a manual start time input, wherein the timing includes providing a first signal at a beginning of the cook mode and a second signal at the end of the cook mode.

2. The system of claim 1 further comprising basket lift means responsive to the control means for automatically lowering a basket containing pasta into the water in response to the first signal and raising the basket from the water in response to the second signal.

3. In a system for preparing pasta, the improvement comprising:
a cooking vat for holding a supply of water having an open top, side walls, and a bottom wall and having a drain including a valve for draining water from the vat and an overflow froth skimming weir defining a maximum water level in the vat at which point water flows from the vat by gravity into a waste drain,
heating means for heating water in the vat,
means for adding water to the vat from a supply of water under pressure including an electrically operated fill valve,
high level detecting means for detecting a normal high water level which is below the level of the overflow weir,
electric control means including means responsive to the high level detecting means for automatically operating the fill valve in response to the high level detecting means to add water to the vat whenever the high level detecting means indicates that water is below the normal high water level to automatically fill the vat and maintain the water substantially at the high water level and below the maximum overflow level during pasta preparation, and
means for selectively maintaining the fill valve open without regard to the signal received from the high level detecting means during a skim cycle to add water to the vat until water overflows through the overflow drain to remove starchy foam from the surface of the water.

4. The system of claim 3 wherein the drain valve, when open, drains water from the vat at a substantially greater rate than water is added to the vat through the fill valve, and wherein the control means maintains the fill valve open during a drain cycle to rinse the vat, and then during a refill cycle after the drain valve is closed at the end of a drain cycle to refill the vat.

5. The system of claim 4 wherein the means for introducing water to the vat introduces water in a flow pattern which tends to rinse the walls of the vat as water is drained from the vat during a drain cycle.

6. The system of claim 3 wherein the means for introducing water to the vat introduces the water in a flow pattern which creates surface currents tending to carry starchy foam on the surface of the water over the weir during a skim cycle.

7. The system of claim 3 wherein:
the heating means is an electrical heating element submersed in water when the vat is filled with water, and further comprising
low water level detection means for detecting a low water level above the heating means and substantially below the normal water level and wherein
the control means is responsive to the low water level detection means for disabling the heating element when the water level is below the low water level.

8. The system of claim 3 wherein:
the cooking vat is electrically conductive;
the detecting means comprises a single conductive element positioned to become immersed in the water when the water reaches the normal high water level and positioned adjacent a wall of the vat, and
the control means includes means for applying an alternating current potential between the conductive element and the wall of the vat and detecting the change in the resistance therebetween when water provides a conductive path between the conductive element and the vat.

* * * * *